C. M. RHODES.
REVERSIBLE TRANSMISSION GEARING.
APPLICATION FILED NOV. 15, 1909.

982,530.

Patented Jan. 24, 1911.
3 SHEETS—SHEET 1.

Witnesses
Samuel Payne
X. H. Butler

Inventor
C. M. Rhodes,
By H. C. Everett Co.
Attorneys

C. M. RHODES.
REVERSIBLE TRANSMISSION GEARING.
APPLICATION FILED NOV. 15, 1909.

982,530.

Patented Jan. 24, 1911.
3 SHEETS—SHEET 2.

Witnesses
Samuel Payne
R. H. Butler

Inventor
C. M. Rhodes
By H. C. Evert Co.
Attorneys

C. M. RHODES.
REVERSIBLE TRANSMISSION GEARING.
APPLICATION FILED NOV. 15, 1909.
982,530.
Patented Jan. 24, 1911.
3 SHEETS—SHEET 3.
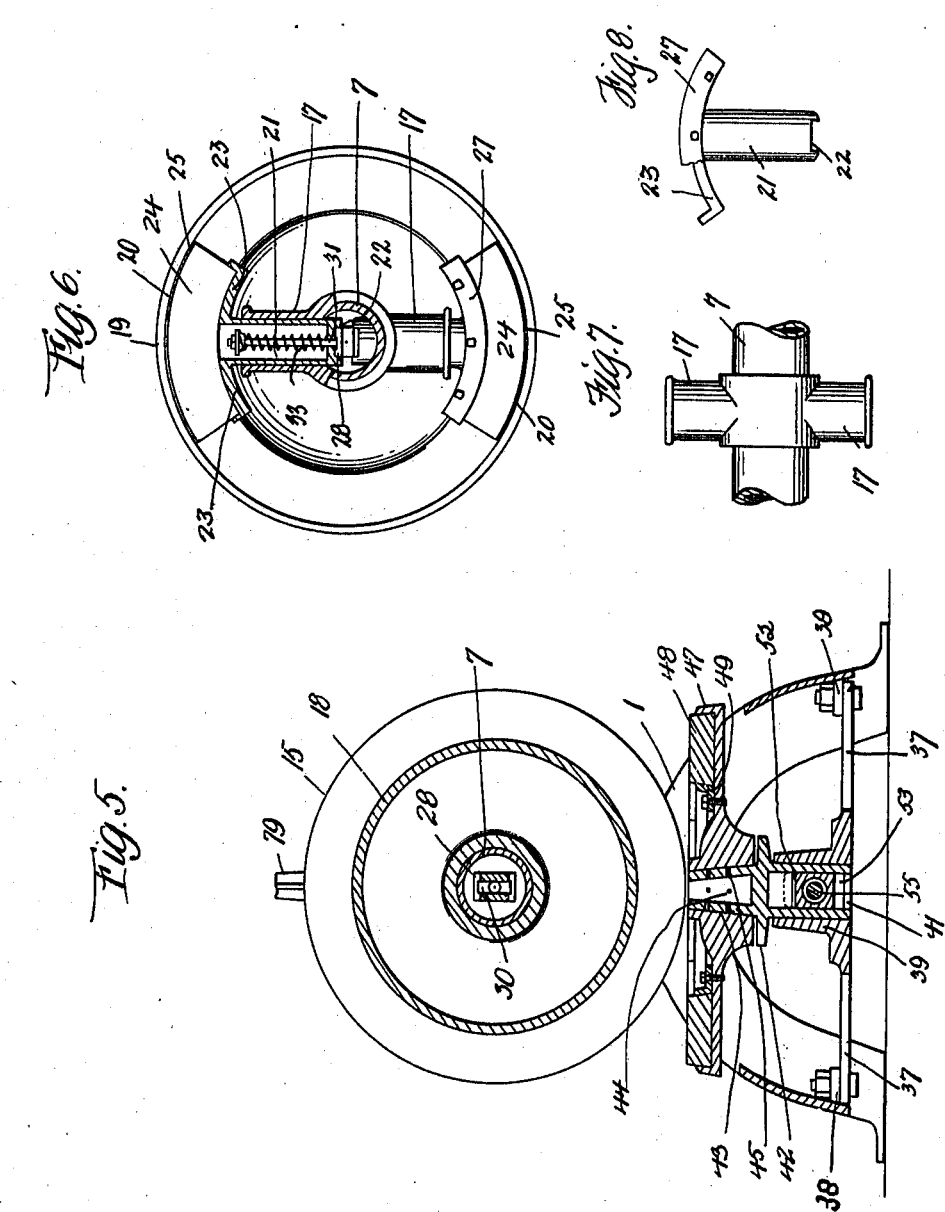
Witnesses
K. H. Butler
A. H. Rabsag
Inventor
C. M. Rhodes,
By
Attorneys

UNITED STATES PATENT OFFICE.

CHARLES M. RHODES, OF STEUBENVILLE, OHIO.

REVERSIBLE TRANSMISSION-GEARING.

982,530.  Specification of Letters Patent.  Patented Jan. 24, 1911.

Application filed November 15, 1909. Serial No. 528,068.

*To all whom it may concern:*

Be it known that I, CHARLES M. RHODES, a citizen of the United States of America, residing at Steubenville, in the county of Jefferson and State of Ohio, have invented certain new and useful Improvements in Reversible Transmission-Gearing, of which the following is a specification, reference being had therein to the accompanying drawing.

This invention relates to reversible transmission gear mechanisms and has for its object to provide a mechanism of such class in a manner as hereinafter set forth for transmitting motion to a pulley from a rotatable element, either in the direction the element is rotated or in a reversed direction.

A further object of the invention is to provide a mechanism of such class in a manner as hereinafter set forth which can be advantageously used in the oil well fields, where it is necessary to position an engine or source of power at a remote point relative to the derrick and further to control the operation of the engine and the mechanism driven thereby.

A further object of the invention is to provide a reversible transmission gear with clutching elements operated by a wedge mechanism, the latter being so set up as to permit the adjustment to compensate for wear of the clutching elements and those elements of the gear which are engaged by the clutching elements.

A further object of the invention is to provide a reversible transmission gear which can be quickly coupled to a rotatable element, and which embodies structural elements easily assembled and maintained in operable condition.

Reference will now be had to the drawings forming a part of this specification wherein there is illustrated a preferred embodiment of my invention, but it is to be understood that the structural elements thereof can be varied or changed, as to the size, shape and manner of assemblage without departing from the scope of the invention as claimed.

Figure 1:
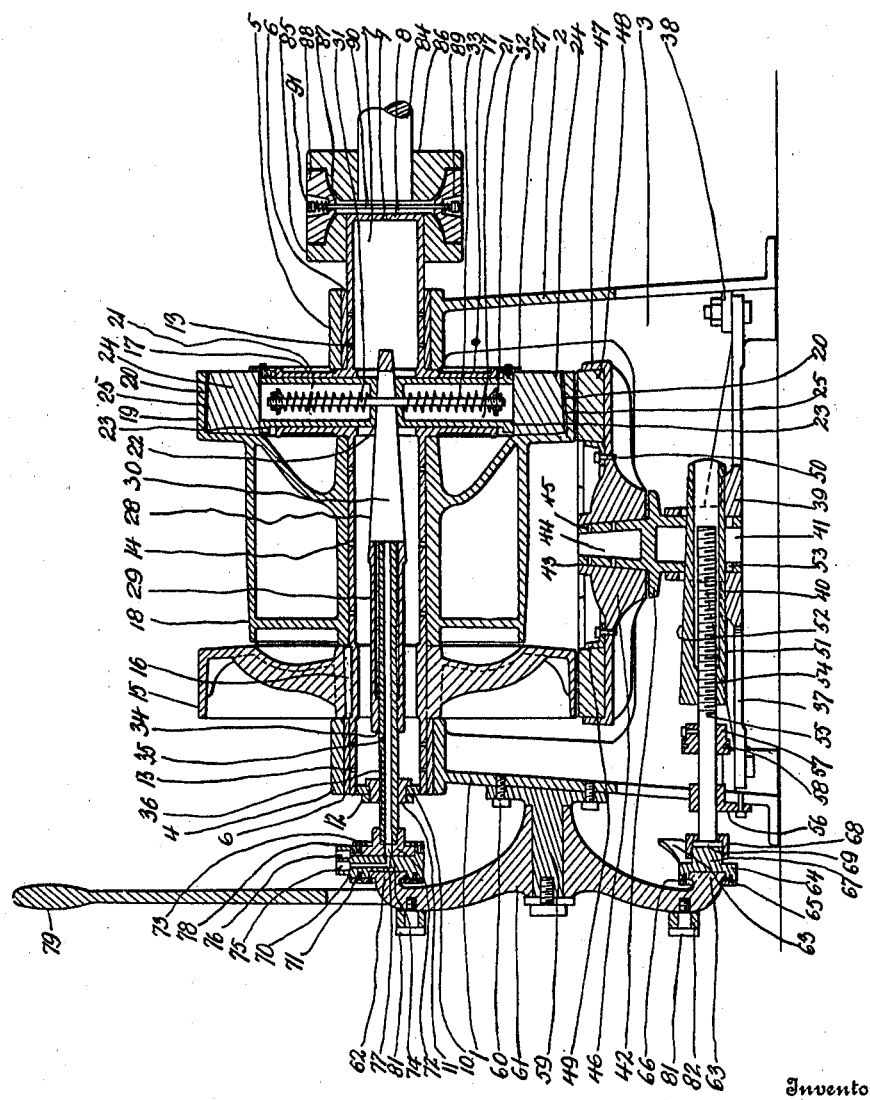
Figure 3:
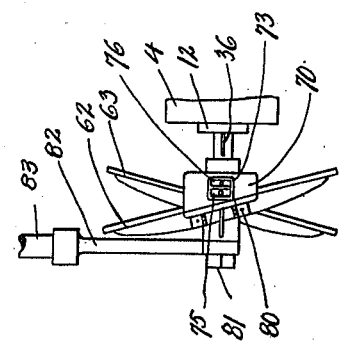
Figure 4:
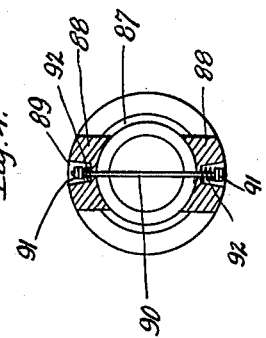
Figure 2:
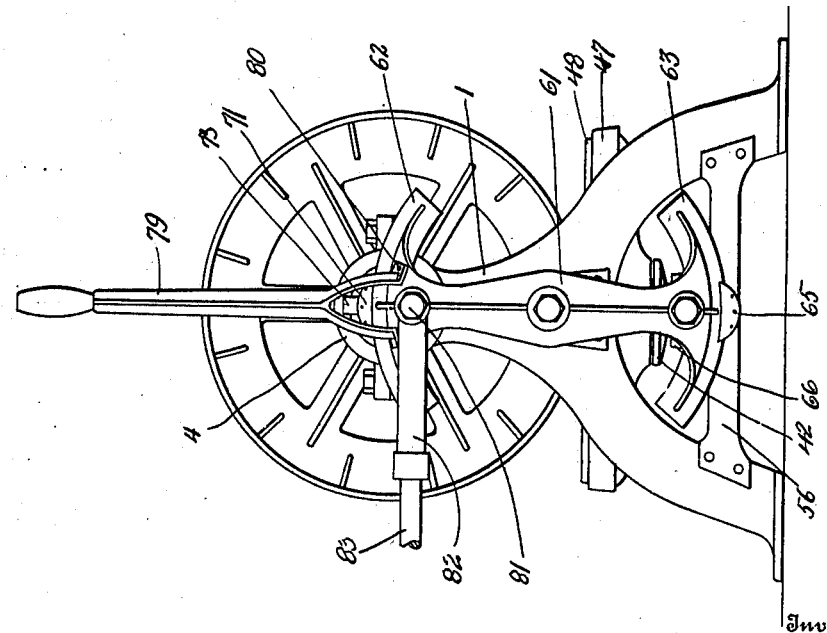

In the drawings:—Figure 1 is a longitudinal sectional view of a reversible transmission gear mechanism in accordance with this invention, Fig. 2 is an end view of the same, Fig. 3 is a plan of the actuating members, Fig. 4 is a cross sectional view of the coupling, Fig. 5 is a vertical cross sectional view of the transmission gear mechanism, Fig. 6 is an end view of a pulley forming part of the transmission gear mechanism, Fig. 7 is a side elevation illustrating the guides for the clutch shoe carriers, Fig. 8 is an elevation of a detached clutch shoe carrier.

In the drawings 1 and 2 denote substantially A-shaped frames connected by integral longitudinal webs 3, these frames constituting a support or housing for my improved gear mechanism. The upper ends of the frames 1 and 2 are provided with bearings 4 and 5 respectively and in said bearings are located bushings 6. Journaled in the bushings 6 is a longitudinal tubular hub 7 having one end thereof closed, as at 8 with the exception of a small lubricant port 9, while the opposite end is provided with a detachable head 10 having a central opening for a revoluble plug 11, said plug being retained within the head 10 by a nut 12. The hub 7 at the bushings 6 is provided with lubricant ports 13 and intermediate the ends with similar ports 14.

15 denotes a wheel keyed or otherwise fixed, as at 16 upon the hub 7 adjacent to the frame 1. The hub 7 adjacent to the frame 2 is provided with two diametrically disposed tubular guides 17 for a pair of clutch shoe carriers. Revolubly mounted upon the hub 7 between the guides 17 and the wheel 15 is a transmission pulley 18 having one side thereof provided with an off-set rim 19 having a beveled inner face 20 and which extends over the guides 17. The wheel 15 is adapted to be coupled with a pulley 18 when the pulley 18 is to be driven in a direction opposite to that in which the hub 7 is rotating.

Mounted within the guides 17 are clutch shoe carriers. Each of said carriers consists of tubular stems 21 which project through the inner ends of the guides and into the hub 7. The inner ends of each of the stems 21 are closed and also provided with a tapering groove 22, which converges toward the frame 2, the groove 22 of one stem opposing the groove 22 of the other stem. The clutch shoe carriers not only comprise the stems 21, but also segment shaped holders 23, which are carried by the outer ends of the stems 21 exteriorly of the guides 17. Mounted against the holders 23 are segment shaped clutching or gripping shoes 24 each having its outer face beveled as at 25 and adapted to engage the inner face 20 of the rim 19. When the shoes 24 are in engagement with the rim 19 of the pulley 18, the pulley 18 is clutched with the hub 7 so as to rotate in the same direction as that in which the hub 7 is rotating. The shoes 24 are retained upon the holders 23 by the segment shaped side plates 27 which are connected by hold fast devices to the holders 23. The carriers are simultaneously moved outwardly, so that the shoes 24 will simultaneously engage the inner face 20 of the rim 19, so as to clutch the pulley 18 to the hub 7. The shifting of the carriers is had through the medium of a wedge mechanism, which will now be referred to.

28 denotes the tapering end of a longitudinally shiftable member 29, said tapering end being rectangular in cross section and fitting in the grooves 22 of the shoe carriers. The tapering end 28 is provided with a longitudinal slot 30 and extending through said slot and the confronting ends of the stems 21 is a tension device for normally retaining the shoe carriers in engagement with the tapering end 28 of the member 29. This tension device comprises a rod 31 extending within proximity to the holders 23. The ends of the rod 31 are provided with detachable nuts and caps 32 and encircling said rod are coil springs 33. These springs are adapted to bear against the inner ends of the stems 21 and retain them in engagement with the tapering end 28 of the member 29. The shiftable member 29 is hollow and interiorly threaded at one end, as at 34 to receive a tubular rod 35 which extends through the revoluble plug 11 and is adapted to rotate with said plug by virtue of being keyed to said plug, as at 36. The means for actuating the member 29 will be presently referred to.

The mechanism for clutching the pulley 18 to the wheel 15 so as to drive the pulley 18 in a direction opposite to that in which the hub is operating comprises a horizontally-disposed four-legged spider 37 connected to inwardly projecting lugs 38, carried by the inner sides of the legs of the frames 1 and 2. The spider is provided with a vertically disposed centrally arranged bearing 39 having longitudinal oppositely disposed slots 40, and movably mounted in the bearing 39 and adapted to be vertically adjusted therein is a hub 41 having a central peripheral flange 42. The upper end of the hub is tapered, as at 43 and provided with a lubricant chamber 44 and lubricant ports 45.

46 denotes a horizontally-disposed revoluble wheel loosely mounted upon the upper tapering end of the hub and which is provided with a rim 47 against which are arranged a plurality of clutching shoes 48. The shoes 48 are retained in place by an inner rim 49 suitably secured to the wheel 46, as at 50. The shoes 48, as well as the shoes 24, can be made of wood or any durable material.

The wheel 46 is shifted by a wedge mechanism so as to bring the shoes 48 into clutching engagement with the outer face of the rim 19 of the pulley 18 and also into engagement with the wheel 15. The said wedge mechanism consists of a longitudinally shiftable member 51 which is tapered, as at 52, the said tapering portion 52 extending through the longitudinal slots 40 of the bearing 39 and also through diametrically opposed slots 53 provided therefor in the lower end of the hub 41. The member 51 rests upon the bearing 39 and supports the hub 41 within said bearing. The member 51 has one end thereof interiorly screw threaded, as at 54 for a threaded rod 55, said rod being revolubly mounted in a transverse brace 56, carried by the legs of the frame 1. The member 51 is preferably rectangular in cross section whereby it cannot rotate in the bearing 39 or the hub 41, and in order to rotate the rod 55 and adjust the member 51 relative to said rod, the rod 55 is provided with a fixed collar 57 having sockets 58 for a spanner wrench, (not shown).

Projecting laterally from the frame 1 is a bearing bracket 59 which is secured in position by the hold fast devices 60. Mounted intermediate its ends upon the bearing bracket 59, is an oscillatory arm 61 having each of its ends provided with a segment shaped actuating member. The member at the upper ends of the arm 61 is indicated by the reference character 62 and the member at the lower end by the reference character 63. These members are angularly-disposed and one extends in an opposite direction with respect to the other and each is upon an arc having for its center the bracket 59. The function of the members 62 and 63 is to move the wedge shaped rods 35 and 55 in opposite directions with respect to each other, the movement being simultaneous.

The member 63 is retained in engagement with a coupling member 64 by plates 65 and 66 secured to the member 64. The member 64 is provided with an exteriorly screw threaded stem 67 and mounted upon said stem is a coupling piece 68 adapted to hold the headed end 69 of the rod 55 in engagement with the coupling member 64. The member 62 is connected to a coupling member 70 by plates 71, and said coupling member 70 is connected to a coupling piece 72 by a ring 73, said ring revolubly holding the coupling piece in engagement with the coupling member. The coupling piece 72 is connected to the end of the tubular rod and is provided with a lubricant port 74 communicating with the bore of the tubular rod 35. The coupling member 70 is provided with lubricant wells 75 and 76, the former communicating with the port 74 by a port 77, while the latter has a port 78 to convey lubricant to the bearing surfaces of the coupling piece 72.

79 denotes an oscillatory lever having the lower end thereof bifurcated and fixed to the actuating member 62, as at 80.

81 denotes stub bolts mounted in the upper and lower ends of the arm 61 adjacent to the actuating members 62 and 63. These bolts are provided with links 82 adapted to be connected to rods or cables 83.

84 denotes a driven shaft representing an engine shaft or the armature shaft of a motor. This shaft is connected to the closed end of the hub 7 by a coupling, comprising two heads 85 and 86, the former being fixed upon the end of the hub 7, while the latter is fixed upon the driven shaft 84. The heads 85 and 86 have the confronting sides thereof provided with annular enlargements 87 and adapted to engage these enlargements are oppositely disposed gripping blocks 88. The blocks 88 are provided with sockets 89 and extending from one block to the other is a tie rod 90. The ends of said rod are retained within the sockets 89 of the blocks 88 by nuts 91 and coil springs 92, said springs encircling the ends of said rod between the nuts 91 and the bottom of each socket. The springs serve functionally for yieldably holding the blocks 88 in engagement with the heads 85 and 86.

In order that the operation of the transmission gear mechanism can be fully understood, it is well to retain in mind the movements of various parts which are as follows:—The wheel 15 and the shoes 24 always move in the same direction as the hub 7. The pulley 18 moves in the same direction as the hub 7 when the shoes 24 engage the off-set rim of said pulley. When the wheel 46 is elevated to engage the wheel 15 and the off-set rim 19 of the pulley 18, said pulley revolves in an opposite direction or reverse direction from that of the hub 7. The shoes 24 are never in frictional engagement with the rim 19 of the pulley 18 when the shoes 48 of the wheel 46 are in frictional engagement with the wheel 15 and the rim 19. With these facts in mind, the operation of my transmission gear mechanism is as follows:—When the driven shaft 84 is in operation, the hub 7 is rotated, and as shown in Fig. 1 of the drawings the oscillatory lever 79 is set vertically and the shoes 24 and 48 are out of engagement with the rim 19 and the wheel 15, thus allowing the hub 7 and the wheel 15 to freely rotate with the driven shaft 84, while the pulley 18 remains idle upon the hub 7. Assuming now that the oscillatory lever 79 is swung to the left, (reference being had to Figs. 2 and 3), the actuating member 62 forces the tubular rod 35 inwardly and moves the tapering end 30 of the longitudinally shiftable member 29 inwardly, thereby forcing outwardly the shoe carriers, causing the shoes 24 of said carriers to frictionally engage the off-set rim 19 of the pulley 18. The pulley 18 is then caused to rotate in the same direction as the driven shaft 84, hub 7 and wheel 15. Simultaneously with the inward movement of the tubular rod 35, the rod 55 is moved outwardly, this being accomplished by the actuating member 63. The hub 41 is lowered thus lowering the wheel 46 whereby the shoes 48 thereof cannot contact with either the wheel 15 or the rim 19. I will now assume that the lever 79 is thrown to the right and that through the medium of the actuating members 62 and 63, the rod 35 is drawn outwardly and the rod 59 pushed inwardly. The shoes 24 are then moved out of frictional engagement with the rim 19 of the pulley 18 and the wheel 46 is elevated to place the shoes 48 thereof in engagement with the wheel 15 and the rim 19 of the pulley 18. The pulley 18 will then be revolved in an opposite direction from that of the driven shaft 84 and the hub 7. To compensate for the wear of the shoes 24 and 48, the rods 35 and 55 have been adjustably connected to the members 29 and 52.

An important characteristic of my invention is the provision made for lubricating the movable parts of the transmission gear mechanism. Lubricant placed in the well 75 of the coupling member 70 readily passes through the port 77 of said member and port 74 of the coupling piece 72 into the tubular rod 35, from said rod to the slot 30, to the hub 7, and then through the ports 13 and 14 to lubricate the movement of the hub 7 in the bushings 6 and the pulley 18 upon said hub. A quantity of the lubricant also passes through the port 9 to the coupling device connecting the hub 7 with the driven shaft 84. This coupling device is adapted to relieve the transmission gear mechanism of the jarring and vibrating of the driven shaft 84. Lubricant placed in the well 76 permits of a free movement of the coupling piece 72, while lubricant placed in the chamber 44 insures an easy movement of the wheel 46. Easy access is had to the remainder of the movable parts of the mechanism for lubricating purposes. The links 82 have been provided, whereby the transmission gear mechanism can be easily controlled by rods or cables extending from an engine house to a derrick floor, and when so used the lever 79 can be dispensed with if desired.

Having now described my invention, what I claim as new is:—

1. A reversible transmission gear mechanism comprising a revoluble hub, a wheel fixed thereon and rotating therewith, a pulley loosely mounted upon said hub, means carried by the hub and adapted when actuated to clutch the pulley to the hub whereby the pulley will rotate in the same direction as the hub, means extending in said hub for actuating said clutching means to engage the pulley, and a revoluble member arranged below the wheel and pulley and adapted when actuated to couple the pulley with the wheel whereby the pulley will revolve in a direction opposite to that in which the hub is revolved, and means for operating said member.

2. A reversible transmission gear mechanism comprising a revoluble hub, a wheel fixed thereon and rotating therewith, a pulley loosely mounted upon said hub, means carried by the hub and adapted when actuated to clutch the pulley to the hub whereby the pulley will rotate in the same direction as the hub, means extending in said hub for actuating said clutching means to engage the pulley, and a revoluble member arranged below the wheel and pulley and adapted when actuated to couple the pulley with the wheel whereby the pulley will revolve in a direction opposite to that in which the hub is revolved, means for operating said member, and means whereby the operating means for the clutching means is shifted to inoperative position when the means for operating the member is moved to operative position.

3. A reversible transmission gear mechanism comprising a revoluble hub, a wheel fixed thereon, a pulley loosely mounted on the hub, a pair of guides fixed to the hub and rotating therewith, clutching means carried by said guides and extending in said hub and adapted when actuated to clutch the pulley to the hub whereby the former will rotate with the latter in the same direction, a longitudinally movable means arranged within said hub and adapted when shifted in one direction to move said clutching means to operative position, coupling means arranged below the pulley and wheel and normally out of engagement therewith and adapted when operated to couple the pulley and wheel together whereby the pulley will operate in an opposite direction to that in which the hub is revolving, and a longitudinally-movable means adapted when shifted in one direction to move said coupling means to operative position.

4. A reversible transmission gear mechanism comprising a revoluble hub, a wheel fixed thereon, a pulley loosely mounted on the hub, a pair of guides fixed to the hub and rotating therewith, clutching means carried by said guides and extending in said hub and adapted when actuated to clutch the pulley to the hub whereby the former will rotate with the latter in the same direction, a longitudinally movable means arranged within said hub and adapted when shifted in one direction to move said clutching means to operative position, coupling means arranged below the pulley and wheel and normally out of engagement therewith and adapted when operated to couple the pulley and wheel together whereby the pulley will operate in an opposite direction to that in which the hub is revolving, a longitudinally-movable means adapted when shifted in one direction to move said coupling means to operative position, and means whereby said first mentioned longitudinally movable means is operated to actuate the clutching means and the second mentioned longitudinally movable means is shifted to inoperative position.

5. A transmission gear mechanism comprising a revoluble hub, an annular member fixed thereon and rotating therewith, a pulley loosely mounted upon the hub, means carried by and extending within the hub and adapted when operated in one direction to clutch said pulley whereby the latter will rotate in the same direction as said hub, a horizontally-disposed wheel arranged below said member and pulley and provided with means adapted when said wheel is shifted vertically to engage said member and pulley and couple them together whereby the pulley is rotated in an opposite direction with respect to the movement of said hub, a wedge mechanism arranged within said hub for actuating the clutching means carried by the hub, and a wedge mechanism for vertically moving said wheel.

6. A transmission gear mechanism comprising a revoluble hub, an annular member fixed thereon and rotating therewith, a pulley loosely mounted upon the hub, means carried by and extending within the hub and adapted when operated in one direction to clutch said pulley whereby the latter will rotate in the same direction as said hub, a horizontally-disposed wheel arranged below said member and pulley and provided with means adapted when said wheel is shifted vertically to engage said member and pulley and couple them together whereby the pulley is rotated in an opposite direction with respect to the movement of said hub, a wedge mechanism arranged within said hub for actuating the clutching means carried by the hub, a wedge mechanism for vertically moving said wheel, and means connected to said wedge mechanisms for simultaneously operating them in alternate directions.

7. A reversible transmission gear mechanism, comprising a rotatable element, a pulley mounted thereon, clutching means carried by said element and adapted when actuated to couple the pulley therewith whereby the latter will operate in the direction in which said element is moving, a longitudinally shiftable means arranged within the rotatable element and adapted when shifted in one direction to move said clutching means to operative position, an annular member carried by and rotating with said element, a vertically movable coupling mechanism adapted when operated in one direction to engage said member and said pulley for coupling them together whereby said pulley will operate in a direction opposite to that in which said element is revolving, a longitudinally movable means adapted when operated in one direction to move said coupling means to operative position, means for automatically returning the clutching means to inoperative position when the first mentioned longitudinally movable means is shifted to normal position, said coupling means being movable to normal position by gravity when the second mentioned longitudinally movable means is returned to normal position.

8. A reversible transmission gear mechanism comprising a rotatable element, a pulley mounted thereon, clutching means carried by said element and adapted when actuated to couple the pulley therewith whereby the latter will operate in the direction in which said element is moving, a longitudinally shiftable means arranged within the hub and adapted when shifted in one direction to move said clutching means to operative position, an annular member carried by and rotating with said element, a vertically movable coupling mechanism adapted when operated in one direction to engage said member and said pulley for coupling them together whereby said pulley will operate in a direction opposite to that in which said element is revolving, a longitudinally movable means adapted when operated in one direction to move said coupling means to operative position, means for automatically returning the clutching means to inoperative position when the first mentioned longitudinally movable means is shifted to nomal position, said coupling means being movable to normal position by gravity when the second mentioned longitudinally movable means is returned to normal position, and means for simultaneously moving said longitudinally movable means to their respective operative and inoperative positions.

9. A reversible transmission gear mechanism comprising a rotatable element, an annular member fixed thereon and rotating therewith, a pulley loosely mounted on said element, spring controlled clutching shoes carried by said element and adapted when actuated in one direction to couple said pulley to said element whereby the pulley will rotate in the same direction as said element, a wedge mechanism extending in said element and adapted when shifted to move said clutching shoes to operative position, a vertically movable coupling means adapted when shifted upwardly to couple said pulley and member together, whereby the pulley will operate in the direction opposite to that in which said element is rotating, a wedging mechanism for shifting said coupling means upwardly, said clutching shoes and said coupling means normally out of engagement with said pulley, and means for longitudinally moving said wedging mechanisms.

10. A reversible transmission gear mechanism comprising a rotatable element, an annular member fixed thereon and rotating therewith, a pulley loosely mounted on said element, spring controlled clutching shoes carried by said element and adapted when actuated in one direction to couple said pulley to said element whereby the pulley will rotate in the same direction as said element, a wedge mechanism extending in said element and adapted when shifted to move said clutching shoes to operative position, a vertically movable coupling means adapted when shifted upwardly to couple said pulley and member together, whereby the pulley will operate in the direction opposite to that in which said element is rotating, a wedging mechanism for shifting said coupling means upwardly, said clutching shoes and said coupling means being normally out of engagement with said pulley, and means for simultaneously shifting said wedging mechanisms in opposite directions with respect to each other.

In testimony whereof I affix my signature in the presence of two witnesses.

CHARLES M. RHODES.

Witnesses:
MARY M. HEDDEN,
KARL H. BUTLER.